(12) United States Patent
Zomet et al.

(10) Patent No.: US 8,995,716 B1
(45) Date of Patent: Mar. 31, 2015

(54) IMAGE SEARCH RESULTS BY SEASONAL TIME PERIOD

(75) Inventors: Asaf Zomet, Jerusalem (IL); Gal Chechik, Los Altos, CA (US)

(73) Assignee: Google Inc., Mountain View, CA (US)

(*) Notice: Subject to any disclaimer, the term of this patent is extended or adjusted under 35 U.S.C. 154(b) by 328 days.

(21) Appl. No.: 13/547,550

(22) Filed: Jul. 12, 2012

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

2011/0029561 A1* 2/2011 Slaney et al. ................. 707/772

FOREIGN PATENT DOCUMENTS

JP 2006-279764 * 10/2006 ............... H04N 5/76

OTHER PUBLICATIONS

Udayan et al ("Visual Analysis of Temporal Trends in Social Networks Using Edge Color Coding and Metric Timelines", IEEE, 2011, pp. 549-554).*

* cited by examiner

*Primary Examiner* — Amara Abdi
(74) *Attorney, Agent, or Firm* — Fish & Richardson P.C.

(57) ABSTRACT

Methods, systems, and apparatus, including computer programs encoded on a computer storage medium, for retrieving images based on a seasonal time period. In one aspect, a method includes receiving a query including image data defining an image depicting a subject. A location at which the image was captured by an image capturing device is determined. One or more additional images of the subject that were captured by an image capturing device at the identified location are identified. At least a portion of the additional images are provided in response to receiving the query.

20 Claims, 9 Drawing Sheets

IMAGE SEARCH RESULTS BY SEASONAL TIME PERIOD

BACKGROUND

This specification relates to information retrieval and image classification.

The Internet provides access to a wide variety of resources, such as image files, audio files, video files, and web pages. A search system can identify resources in response to queries. The queries can be text queries that include one or more search terms or phrases, image queries that include images, or a combination of text and image queries. The search system ranks the resources and provides search results that link to the identified resources. The search results are typically ordered for viewing according to the rank.

With respect to image searches, the relevance of an image to a search query is typically determined based on text associated with the image and/or features of the image itself. For example, relevance of an image appearing on a web page to a search query may be based on text that appears on the web page and within a specified proximity of the image. Likewise, features of an image can be extracted and compared to features of other images, or input as a feature vector into a machine learned system, to identify other images that may be relevant to the image.

SUMMARY

In general, one innovative aspect of the subject matter described in this specification can be embodied in methods that include the actions of initializing an image classification model to identify a seasonal time period at which an input image was captured by a camera device based on visual characteristics of the input image, image data for each training image including: a feature vector for the training image and including image feature values specifying a visual characteristic of the training image; and a time value specifying at least one of a time and date at which the training image was captured by a camera device; training the image classification model using the image data of the training images, the training including: iteratively adjusting weights that correspond to the image feature values of the feature vectors and determining whether a convergence condition is met after each iteration; and persisting the image classification model to a data store when the convergence condition is met. Other embodiments of this aspect include corresponding systems, apparatus, and computer programs, configured to perform the actions of the methods, encoded on computer storage devices.

The seasonal time period can include one of an annual season, a time of day, a period of time during a day, and month of the year. Aspects can further include receiving a feature vector of image feature values for an input image; determining, using the image classification model and the feature vector of the input image as an input to the image classification model, a predicted time value indicating a seasonal time period at which the input image was captured by a camera device; and associating the predicted time value with the input image.

Each feature vector can be computed from at least one of a linear binary pattern, a set of visterms, scale-invariant feature transform ("SIFT") feature values, color histograms, image gradients, image spatial moments, wavelets, and image pyramid. The image classification model can include one of support vector machines ("SVM"), a Boosting model, a neural network, a deep belief network, a logistic regression, a graphical model classifier, a K-nearest neighbor classifier, and a classifier trained online using passive aggressive or stochastic gradient descent.

Training the image classification model using the image data of the training images further can include grouping the training images into time-based groups based on the time value for each of the training images, each time-based group being defined by a seasonal time period and being populated with training images that have a time value within the seasonal time period of the time-based group; and for each time-based group, training a classification model for the time-based group using the feature vectors and the time values for the training images in the time-based group.

Aspects can further include receiving a query for an image of a subject, the query identifying a desired seasonal time period at which the image of the subject was captured by a camera device; for each of a multitude of candidate images related to the subject, applying the classification model of each time-based group to a feature vector for the candidate image to identify a seasonal time period during which the candidate image was captured; determining which of the candidate images have an identified seasonal time period that is within the desired seasonal time period; and providing at least a portion of candidate images that have an identified seasonal time period that is within the desired seasonal time period.

The image data for each training image can further include a location value specifying a location at which the training image was captured by a camera device. Training the image classification model using the image data of the training images further can include grouping the training images into location-based groups based on the location value for each of the training images and a location value for each location-based group; for each location-based group, partitioning the training images into subgroups based on the time value for each training image in the location group, each subgroup being defined by a seasonal time period and being populated with training images of the location-based group that have a time value within the seasonal time period of the subgroup; and for each subgroup, training a classification model for the subgroup using the feature vectors and the time values of the training images in the subgroup.

Aspects can further include receiving a query for an image captured at a particular location, the query identifying the particular location and a desired seasonal time period at which the image was captured by a camera device; identifying candidate images corresponding to the particular location; matching the particular location to one of the location-based groups based on the location value for each location-based group; for each of the candidate images, applying the classification model of each subgroup of the one location group to a feature vector for the candidate image to identify a seasonal time period during which the candidate image was captured; determining which of the candidate images have an identified seasonal time period that is within the desired seasonal time period; and providing at least a portion of candidate images that have an identified seasonal time period that is within the desired seasonal time period.

Aspects can further include receiving a query including an image and location information specifying a location at which the image of the query was captured by a camera device; identifying a first subset of candidate images based on the location information and a location tag for each candidate image; selecting a second subset of images from the first subset of images based on a time value for each image of the first subset of images such that the second subset of images comprises images from each of a plurality of seasonal time periods; and providing the selected images.

Another innovative aspect of the subject matter described in this specification can be embodied in methods that include the actions of presenting, by a user device, a search interface that includes a query entry field and a time-filter user interface control element, the time-filter user interface control element enabling a user to select a desired seasonal time period for image search results; receiving, by the user device, at the query entry field, query input defining a search query; receiving, by the user device, an interaction with the user interface control element; determining the desired seasonal time period based on the interaction with the time-filter user interface control element; sending, by the user device, data specifying the query and the desired seasonal time period to a search system; and receiving, by the user device and from the search system, one or more images, the one or more images being responsive to the query and being identified as being captured during the desired seasonal time period. Other embodiments of this aspect include corresponding systems, apparatus, and computer programs, configured to perform the actions of the methods, encoded on computer storage devices.

The time-filter user interface can include an analog clock element having a user adjustable time, the analog clock element including one or more rotatable hands, each rotatable hand being rotatable to select, as the desired seasonal time period, a time during a day. The time-filter user interface control element can include a timeline and a slider, the slider being moveable along the timeline to select the desired seasonal time period. The seasonal time period can include one of an annual season, a month of the year, and a time during the day.

The one or more images can be identified by the search system using one or more image classification models that predict a seasonal time period during which an image was captured based on visual characteristics of the image.

Another innovative aspect of the subject matter described in this specification can be embodied in methods that include the actions of receiving a query including image data defining an image depicting a subject; determining a location at which the image was captured by an image capturing device; identifying, based on the query and the location, one or more additional images of the subject that were captured by an image capturing device at the identified location; and providing at least a portion of the one or more additional images in response to receiving the query. Other embodiments of this aspect include corresponding systems, apparatus, and computer programs, configured to perform the actions of the methods, encoded on computer storage devices.

Identifying location at which the image was captured can include receiving location information specifying the location with the query. Aspects can further include identifying the subject of the image by: creating a feature vector for the image, the feature vector for the image including content feature values, each content feature value indicating a visual characteristic of the image; and comparing the feature vector for the image to feature vectors for images to identify images having a feature vector similar to the feature vector of the image.

Aspects can further include providing a user interface object that enables a user to select a seasonal time period for image search results; receiving a selection of a seasonal time period via the user interface object; and identifying the portion of the one or more additional images, the portion of the one or more additional images being images that were captured by an image capturing device during the selected seasonal time period.

Identifying the portion of the one or more additional images can include identifying, for each of the one or more additional images, a seasonal time period during which the image was captured by an image capturing device using one or more image classification models; and identifying, as the portion, the additional images identified as being captured during the selected seasonal time period.

The user interface object can include a timeline and a slider, the slider being moveable along the timeline to select the desired seasonal time period. Aspects can further include selecting the portion of the one or more additional images, the portion of the one or more additional images comprising images captured during a plurality of seasonal time periods.

Identifying, based on the query and the location, one or more additional images of the subject that were captured by an image capturing device at the identified location can include identifying a direction in which an image capturing device that captured the image was facing at a time that the image was captured; and identifying, as the additional images, images that were captured by an image capturing device located within a threshold distance of the identified location and that was facing in a direction that is within a threshold directional tolerance of the identified direction.

Particular embodiments of the subject matter described in this specification can be implemented so as to realize one or more of the following advantages. A search system can identify images of an object, location, or other subject that were captured within a particular seasonal time period, such as an annual season, period of time during a day, or month of the year. User interfaces can enable users to select the seasonal time period for desired images and to view images corresponding to the selected seasonal time period, thereby allowing users to specify a time criterion to help users satisfy time-dependent informational needs. The seasonal time period at which an image was captured by a camera can be determined using one or more image classification models trained using training images, and thus images that do not have metadata specifying a capture time can be classified according to a determined seasonal time period. This allows for a larger corpus of images being made available to users, which further helps users satisfy their informational needs.

The subject of an input image and the location or vantage point from which the image was captured can be identified and used to identify additional images of the subject captured from the same location or vantage point. This facilitates the identification of images taken from the same vantage point over multiple seasonal events, thereby providing the user with images that may not otherwise have been identified due to visual dissimilarities attributed to seasonal variations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
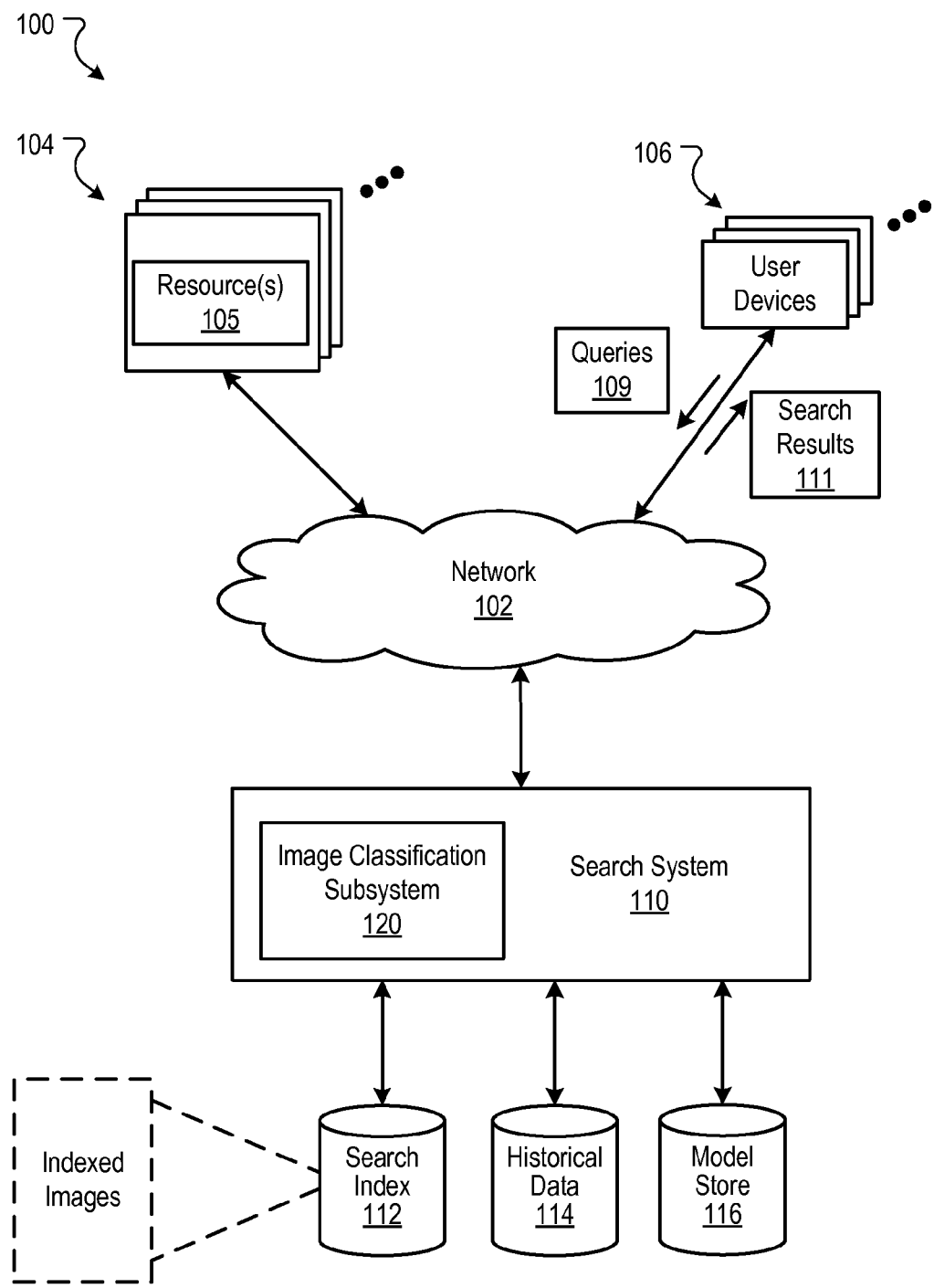
FIG. 1 is a block diagram of an example environment in which a search system provides search services.

This specification describes technologies relating to identifying a seasonal time period for images and retrieving images based on seasonal time period search criteria. In particular, users may want to find images using criteria that may not be present in text associated with an image. For example, a user may want to find images of a particular object or location that was captured during a particular season, e.g., summer or winter. However, if a time of capture is not associated with the image, the search system may not find appropriate images to reference in search results. The subject matter of this application facilities the search of images based on seasonal times even in the absence of data describing the time of image capture.

As used in this specification, seasonality is not limited to seasons of the year; instead, the term describes an identifiable cyclic variation of time or condition, e.g., morning, noon and night, periods of time during which snow is on the ground, etc.

A system enables users to search for images of an object, location, or other entity that were captured during a particular seasonal time period, such as an annual season, period of time during a day, or month of the year. The system can predict or identify the seasonal time period during which images were captured and associate the identified seasonal time period with the image, for example in a search index. When a search query is received that includes information specifying a seasonal time period, the system identifies images relevant to the received query and that were captured during the specified time period. For example, a user may submit a search query for images of the Eiffel Tower in spring. In response, the system can identify images of the Eiffel Tower that are predicted or known to have been captured in the spring and provide search results that reference the identified images.

In some implementations, the system can predict the seasonal time period for candidate images for a search query online after receiving the search query. For example, the system may identify a set of images relevant to the query and identify which of the set of images are likely to have been captured during a time period specified by the user.

The system predicts the seasonal time period during which an image was captured using one or more image classification models. In general, the image classification models predict the seasonal time period for an input image based on the visual characteristics, e.g., color, texture, etc., of the input image. The classification models can be trained using training images for which the time and/or date that the training image was captured is known.

In some implementations, the system provides a user interface that enables users to select a particular seasonal time period for viewing images. In some implementations, the user interface includes a text entry box that a user can enter a text query and a time period. For example, the user may enter the query "Eiffel Tower in the spring." In some implementations, the user interface includes a time-filter user interface control element, such as a slider, scroll bar, interactive timeline, or interactive clock, that allows the user to select a desired seasonal time period, or scroll through images by seasonal time periods.

The system can identify and provide images of an object, location, or other entity for a multitude of seasonal time periods in response to receiving a general search query for images of the subject. For example, the system may identify and provide images of the Statue of Liberty in spring, summer, fall, and winter in response to receiving a search query directed to images that uses the text "Statue of Liberty."

The system processes search queries in the form of images or that include an image ("image search query") to identify a subject of the image and identify other images of the identified subject. The system can also identify the vantage point or location from which the image was captured and identifies other images of the subject taken from the same vantage point or location. For example, a user visiting the Eiffel Tower during the spring may want to view images of Paris taken from the top of the Eiffel Tower during other seasons. The user may capture an image of Paris from the top of the Eiffel Tower using a GPS enabled smartphone and submit the image as a search query to the system. In turn, the system can process the image and metadata to identify that the image depicts Paris and that the image was captured from the top of the Eiffel Tower. Using this information, the system can identify and provide to the user other images of Paris taken from the top of the Eiffel Tower and captured during various seasonal time periods. For example, the system may identify and provide to the user images of Paris captured from the top of the Eiffel Tower during each annual season.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The network 102 can be accessed over a wired and/or a wireless communications link. For example, mobile computing devices, such as smartphones, can utilize a cellular network to access the network 102. The environment 100 may include millions of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided over the network 102 and that is associated with a resource address. Resources 105 that can be provided by a web site 104 include HTML pages, word processing documents, portable document format (PDF) documents, images, videos, and feed sources, to names just a few. The resources 105 can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources 105 over the network 102. Example user devices 106 include personal computers, mobile computing devices, e.g., smartphones and/or tablet computing devices, that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 typically includes a user application, e.g., a web browser, instant messaging program, or a mail program, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally cached copies of the resources 105 are stored in a search index 112.

The user devices 106 submit search queries 109 to the search system 110. In response, the search system 110 accesses the search index 112 to identify resources 105 that are relevant to the search query 109. The search system 110 identifies the resources 105, generates search results 111 that identify the resources 105, and returns the search results 111 to the user devices 106.

The search query 109 can include one or more search terms. A search term can, for example, include a keyword submitted as part of a search query 109 to the search system 110 that is used to retrieve responsive search results 111. In some implementations, a search query 109 can include data for a single query type or for two or more query types, e.g., types of data in the query. For example, the search query 109 may have a text portion, and the search query 109 may also have an image portion. A search query 109 that includes data for two or more query types can be referred to as a "hybrid query." In some implementations, a search query 109 includes data for only one type of query. For example, the search query 109 may only include image query data, e.g., a query image, or the search query 109 may only include textual query data, e.g., a text query.

A search result is data generated by the search system 110 that identifies a resource 105 that is responsive to a particular search query, and includes a link to the resource 105. An example search result 111 can include a web page title, a snippet of text or an image or portion thereof extracted from the web page, and a hypertext link, e.g., a uniform resource locator (URL), to the web page. An image search result typically includes a representation of the image referenced by the search result, but is often not the referenced image. For example an image search result may include a reduced-sized version of the referenced image, e.g., a thumbnail image, or a cropped version of the referenced image.

For a search directed to text, the search results 111 are typically ranked based, in part, on scores related to resources 105 identified by the search results 111, such as information retrieval ("IR") scores, or other relevance scores. In some implementations, the relevance scores are used in combination with quality scores, such as "page rank" scores, to rank the search results 111. The search results 111 are ordered according to these relevance scores and are provided to the user device 106 according to the order. For a search directed to images that uses a text query as input, the search system 110 can combine the relevance score of a resource with a relevance feedback score of an image embedded in the resource. An example relevance feedback score is a score derived from a selection rate, e.g., click-through-rate, of an image when that image is referenced in a search result for a query. These combined scores are then used to present search results directed to the images embedded in the resources 105.

The relevance scores for an image can be based on labels that are associated with the image. Labels are text or data flags that indicate a topic to which the image belongs. Labels can be explicitly associated with an image, for example, by the publisher that is providing the image. For example, a publisher may associate the text "morning" or "sunrise" with an image captured at sunrise. In some implementations, labels can also be explicitly associated with an image by users to whom the image is presented. The labels may be stored in the search index 112 with reference to the corresponding image.

An image classification subsystem 120 may associate labels with an image that specify the seasonal time periods during which the image was predicted or determined to have been captured by an image capturing device. For example, the image classification subsystem 120 may predict that an image was captured in the morning and further predict that the image was captured during the summer. The image classification subsystem 120 may associate labels with the image that specify those time periods. This image classification and labeling process may occur offline, for example via a batch process, or online, e.g., at query time, in response to receiving a query. The labels specifying the seasonal time period may be stored in the search index 112 with a reference to the corresponding image.

As described in more detail below, the image classification subsystem 120 can apply one or more image classification models to image data for an image to predict the seasonal time period during which the image was likely captured. The image classification models are stored in a data store, such as the model store 116.

The relevance score for an image to a query can be based on how well the image label matches the query. For example, an image having a label that is the same as the query can have a higher relevance score to the query than an image having a label that is a root of the query or otherwise matches the query based on query expansion techniques, e.g., synonym identification or clustering techniques. Similarly, images having labels that match the query are identified as more relevant to the query than images that do not have labels matching the query. In turn, the images having the labels that match the query may be selected for reference at higher search result positions in a search results page than images that do not match the query.

The user devices 106 receive the search results pages and render the pages for presentation to the users. In response to the user selecting a search result 111 at a user device 106, the user device 106 requests the resource identified by the resource locator included in the search result 111. The web site 104 hosting the resource 105 receives the request for the resource 105 from the user device 106 and provides the resource 105 to the requesting user device 106.

Data for the search queries 109 submitted during user sessions are stored in a data store, such as the historical data store 114. For example, for search queries that 109 are in the form of text, the text of the query is stored in the historical data store 114. For search queries 109 that are in the form of images, an index of the images is stored in the historical data store 114, or, optionally, the image is stored in the historical data store 114.

Selection data specifying actions taken in response to search results 111 provided in response to each search query 109 are also stored in the historical data store 114. These actions can include whether a search result 111 was selected, and for each selection, for which search query 109 the search result 111 was provided. The data stored in the historical data store 114 can be used to map search queries 109 submitted during search sessions to resources 105 that were identified in search results 111 and the actions taken by the users. For example, the historical data can map how many times each image indexed in the search index 112 was selected when presented in the form of a search result 111. As used herein, an image that is referenced in a search result is considered to be selected when the search result referencing the image is selected by a user.

The image classification subsystem 120 can generate and utilize image classification models to identify or predict one or more seasonal time periods during which an image was captured by an image capturing device, such as a camera. For example, the image classification subsystem 120 may generate an image classification model for predicting an annual season that an image was captured, an image classification model for predicting a period of time during the day that an image was captured, and/or an image classification model for predicting a month of the year that an image was captured.

Although the image classification subsystem 120 is illustrated and described as a subsystem of the search system 110, the image classification subsystem 120 can be implemented as an entirely separate system or apparatus in data communication with the search system 110.

The image classification subsystem 120 can train one or more image classification models to predict the seasonal time period during which images were captured based on content features of the images. In general, a content feature is a visual characteristic of an image or of a portion of an image, such as color, histograms of image color or grayscale data, texture, hue, resolution, edges, corners, geometric information, image centers of gravity, image gradients, image spatial moments, wavelets, image pyramid, entropies, color counts, contrast, scale-invariant transforms, line segments, and other characteristics of the image. A content feature value is a value indicative of a corresponding visual characteristic of a portion of an image. For example, a content feature value of a color content feature may be a value indicative of the color blue at a particular location or three values indicative of the average color for a region. Thus, the content feature value can specify a visual characteristic of an image.

In some implementations, the image classification subsystem 120 generates an image classification model for each type of seasonal time period by which the image classification subsystem 120 enables users to filter images. For example, an image classification model may be trained to predict a time during the day—or range of times during the day, e.g., between 08:00 AM and 12:00 PM—in which an image was captured. Such a model may be trained using the content feature values of the training images and the time at which the training images were captured. Another classification model may be trained to predict an annual season during which an image was captured. Such a model may be trained using the content feature values of the training images and the date at which the training images were captured. Other models may be trained to predict the month of the year or period of the day, e.g., morning, afternoon, evening, or night. In operation, the classification models can be used in parallel to determine various seasonal aspects of an image, e.g., winter images take during full daylight hours.

The image classification system 120 can generate classification models using any number of training and modeling processes. For example, the image classification subsystem 120 can utilize large margin classifiers, e.g., a support vector machine (SVM) or a Boosting classifier, or online classifiers, e.g., a classifier trained online using passive aggressive or stochastic gradient descent. The image classification subsystem 120 can also utilize neural networks, deep belief networks, logistic regression, graphical model classifiers, and/or K-nearest neighbor classifiers.

In some implementations, the image classification subsystem 120 generates one or more multi-class image classification models that can predict which of a finite set of seasonal time periods an image was captured during. For example, a multi-class image classification model can be used to predict which of the four annual seasons an image was captured. By way of another example, a multi-class image classification model can be used to predict which period of a day an image was captured, e.g., morning, noon, afternoon, evening, or night.

A multi-class image classification model can utilize multiple image classification models. For example, a multi-class image classification model may include an image classification model for each seasonal time period, e.g., one for spring, one for summer, one for autumn, and one for winter. Each image classification model may output a function or score that indicates the probability that the image was captured during its seasonal time period. For example, a higher score output by an image classification model may indicate a greater likelihood that the image was captured during the seasonal time period for the image classification model than a lower score.

A multi-class image classification model can be based on a one-versus-all approach or a one-versus-one approach. In a one-versus-all approach, prediction of the seasonal time period of an input image is completed using a winner-takes-all strategy, in which the seasonal time period for the image classification model with the highest output score is assigned to the input image. For example, if the image classification model for summer outputs a higher score than the score output by the image classification models for the other seasons, then the image classification subsystem 120 may predict that the input image was captured during the summer in a one-versus-all approach.

In a one-versus-one approach, each image classification model determines which of two seasonal time periods during which an input image is more likely to be captured. For example, there may be an image classification model for each annual season versus each other annual season, e.g., fall versus winter, fall versus spring, fall versus summer, winter versus spring, winter versus summer, and spring versus summer. The predicted seasonal time period for the input image is the seasonal time period that wins the most votes from the image classification models. For example, if spring wins in all three of its image classification models, then the image classification subsystem 120 may predict that the input image was captured in the spring as no other season could win more than two votes.

Figure 2:
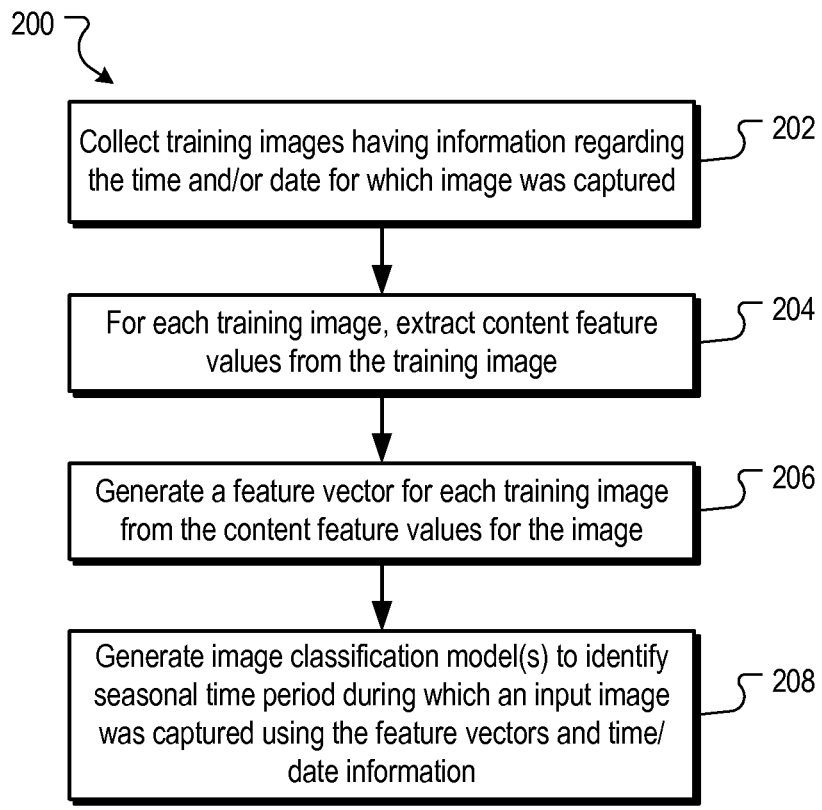
FIG. 2 is a flow chart of an example process for training image classification models.

FIG. 2 is a flow chart of an example process 200 for training image classification models. The process 200 can, for example, be implemented by a data processing apparatus of the image classification subsystem 120.

Images having information regarding the time and/or date for which the image was captured are collected for use as training images (202). For example, images captured by a digital camera, digital camcorder, or communication device having a camera installed thereon, are often stored in a file format that includes metadata or tags that specify the date and time at which the images were captured by the device. One example image file format is the exchangeable image file format ("Exif"). For ease of subsequent discussion, the images that have associated information that specifies the time and/or date at which the image was captured is referred to as having a timestamp that specifies the date and/or time.

In some implementations, the image classification subsystem 120 evaluates image files for images indexed in the search index 112 to determine which images have a timestamp and collects the images having a timestamp. In some implementations, the image classification subsystem 120 includes, in the search index 112, information specifying whether each image has a timestamp. If a timestamp is available for the image, the time information may also be included in the search index 112.

Content feature values are extracted from each collected training image (204). For example, the image classification subsystem 120 may process the image data for each training image to extract the content feature values from the training image. In some implementations, the extracted content feature values are stored in a data store, such as the model store 116, with a reference to the training image from which the content feature values were extracted.

A feature vector is generated for each collected image (206). For example, the image classification subsystem 120 may generate, for each training image, a feature vector that includes the content feature values for the image. Some exemplary feature vectors include linear binary patterns ("LBP"), visterms, and scale-invariant feature transforms ("SIFT"), to name a few. Other content feature representations may also be used, such as a bag-of-features or bag-of-visterms representation.

One or more image classification models are generated using the feature vectors and the time information of the training images (208). For example, the image classification subsystem 120 may generate the image classification model(s).

In a one-versus-all approach, the image classification subsystem 120 may segment the training images into time-based groups and train an image classification model for each time-based group. For example, training images for an image classification model that predicts the annual season during which an image was captured may be segmented into a group for each annual season, e.g., a group for images captured during the winter, a group for images captured during the spring, a group for images captured during the summer, and a group for images captured during the autumn.

Figure 3:
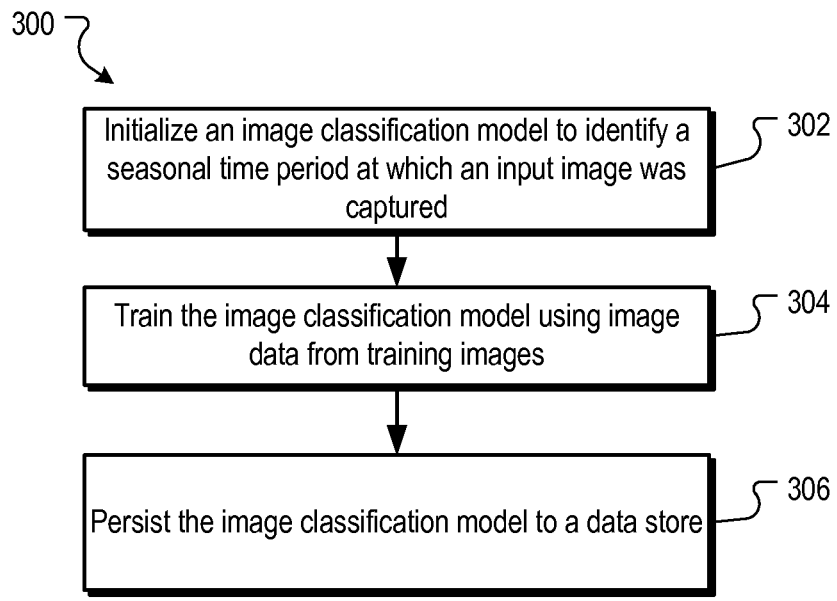
FIG. 3 is a flow chart of an example process for training an image classification model.

The image classification subsystem 120 can train an image classification model for each group using the training images assigned to that group. Each image classification model can be trained to output a score that indicates the likelihood that an input image was captured during the seasonal time period for the image classification model. For example, an image classification model for summer may predict whether or not an image was captured during the summer or output a score indicative of the likelihood that the image was captured during the summer. To predict the seasonal time period during which an input image was captured, the image classification subsystem 120 can apply each image classification model to a feature vector for the input image and compare the outputs of the image classification models to determine which image classification model output the highest score. The classification subsystem 120 can deem the seasonal time period for the image classification model that output the highest score the seasonal time period during which the input image was captured. An example process for training image classification models using time-based classification models is illustrated in FIG. 3 and described below.

In some implementations, the image classification subsystem 120 trains image classification models based on the location for the images. For example, the visual characteristics of an image captured in New York during the winter may be substantially different than the visual characteristics of an image captured in southern California during the winter.

The image classification subsystem 120 can segment the training images into location-based groups based on the location at which the images were captured. In some implementations, the search index 112 includes a geolocation tag for at least a portion of the images that specifies the location at which the image was captured. For example, the geolocation tag for an image may include information specifying the longitudinal and latitudinal coordinates at which an image was captured. This information may be obtained from global positioning system (GPS) information included in the image files for the images. Each location-based group can include images within a certain area defined by longitudinal coordinates and/or latitudinal coordinates. Or, the location-based groups may be based on cities, counties, states, regions, countries, or other location designations.

Figure 4:
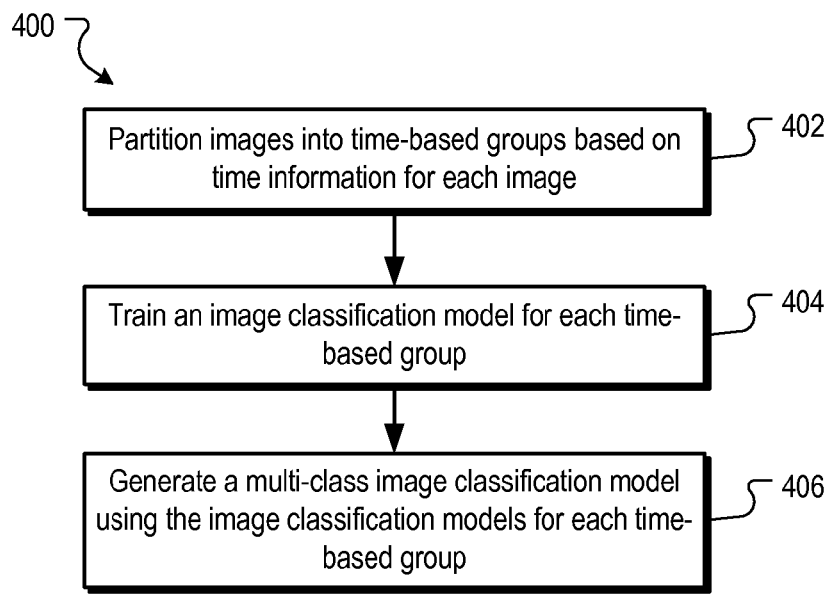
FIG. 4 is a flow chart of an example process for generating image classification models using time-based groups.

The image classification subsystem 120 can segment each location-based group into time-based subgroups, e.g., annual season, time of day, etc., and train an image classification model for each time-based subgroup. To predict the seasonal time period for an input image using this approach, the image classification subsystem 120 can determine the location at which the input image was captured and utilize the image classification models for the time-based subgroups of that location. An example process for training image classification models based on location is illustrated in FIG. 4 and described below.

FIG. 3 is a flow chart of an example process for training an image classification model. The process 300 can, for example, be implemented by a data processing apparatus of the image classification subsystem 120.

An image classification model is initialized (302). In some implementations, the image classification subsystem 120 initiates the image classification model to identify a seasonal time period at which an input image was captured by a camera device, for example in response to a request received from a user device. Initializing the image classification model can include identifying training images and image data for the training images. The image data for a training image can include a feature vector that includes image feature values. Each image feature value can specify a visual characteristic of the training image, such as color, histograms of image color or grayscale data, texture, hue, resolution, edges, corners, geometric information, image centers of gravity, image gradients, image spatial moments, wavelets, image pyramid, entropies, color counts, contrast, scale-invariant transforms, line segments, and other characteristics of the image.

The image data for each training image may also include a time value specifying a time and/or date at which the training image was captured by a camera device. For example the training images may be stored in image file, such as an Exif image file that includes a tag that specifies the time and or date at which the training image was captured.

The image classification model is trained using the image data for the training images (304). In some implementations, the image classification subsystem 120 trains the image classification model by iteratively adjusting weights that correspond to the image feature values of the feature vectors and determining whether a convergence condition is met, or until a training condition is satisfied.

The trained image classification model is persisted to a data store (306). For example, the image classification subsystem 120 may store the trained image classification model in the model store 116.

FIG. 4 is a flow chart of an example process 400 for generating image classification models using time-based groups. The process 400 can, for example, be implemented by a data processing apparatus of the image classification subsystem 120.

Training images are partitioned into time-based groups based on the time information for each image (402). For example, if the image classification model is for determining the annual season during which an input image was captured, the image classification subsystem 120 may generate a group for each annual season and partition each training image into the appropriate group. To determine the group for which a training image belongs, the image classification subsystem 120 may access the time information of the image file for the image. For example, and Exif image file may include one or more tags that specify the time and/or date at which the image was captured.

An image classification model is trained for each group (404). For example, the image classification subsystem 120 may train an image classification model for each group based on the content feature values and the timing information of the training images in the group using machine learning techniques.

In some implementations, the image classification subsystem 120 trains an image classification model for a group of images by partitioning the images of the group into a training set and a testing set. For example, ⅔ of the training images may be assigned to the training set and ⅓ of the training images may be assigned to the test set. Other proportions for the training set and the testing set may also be used.

The image classification subsystem 120 can use these partitions for training and testing the image classification model. In particular, the image classification subsystem 120 can train the image classification model to predict whether an input image was captured during the seasonal time period for the image classification model and test the training. For training the image classification model, the content feature values of the images in the training set and their associated time information are used to generate weights for the content features using machine learning techniques. The weights are iteratively selected and adjusted until a set of feature weights are selected so that the image classification subsystem 120 generates predicted seasonal time periods for the training images that match the actual timing information to an acceptable degree of accuracy. These feature weights are then persisted in the model store 116.

A multi-class image classification model is generated using the image classification models for each time-based group (406). For example, the image classification subsystem 120 may generate a one-versus-all model that compares the outputs of each time-based group's image classification model to determine which seasonal time period an image was captured during. Such a model may be configured to apply each image classification model to a feature vector of an input image, compare the output of each image classification model to determine which image classification model output the highest score, and consider the input image to have been captured during the seasonal time period for the image classification model that output the highest score.

Figure 5:
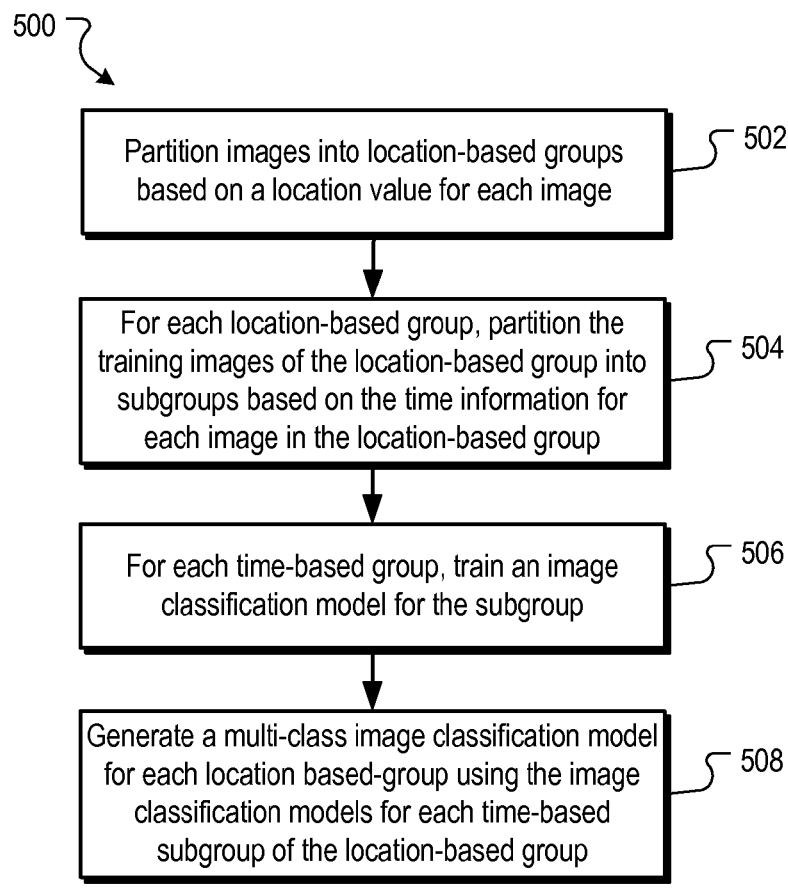
FIG. 5 is a flow chart of an example process for generating image classification models using time-based groups.

FIG. 5 is a flow chart of an example process for generating image classification models using time-based groups. The process 500 can, for example, be implemented by a data processing apparatus of the image classification subsystem 120.

Training images are partitioned into location-based groups based on the location at which the images were captured (502). For example, each training image may include a geolocation tag that specifies the location at which the training image was captured. The image classification subsystem 120 can evaluate the location information for each training image and assign the training images to the location-based groups based on the location information.

The location-based groups may be defined based on longitudinal and latitudinal coordinates, cities, counties, states, regions, countries, or other location designations. For example, all or a portion of the Earth's surface may be segmented into equal-sized polygons and a location-based group may be created for each segment. Training images that were captured within a segment may be assigned to that segment.

For each location-based group, the training images are partitioned into time-based groups based on the time information for each training image (504). For example, if the image classification model is for determining the month of the year during which an input image was captured, each location-based group may include a group of images for each month of the year. To illustrate, consider a location-based group that includes the city of Phoenix. A training image that was captured in Phoenix during the month of August may be partitioned into the time-based subgroup for August of the location-based group that includes Phoenix.

An image classification model is trained for each time-based subgroup of each location-based group (506). For example, the image classification model 120 may train an image classification model for each time-based subgroup as described above with reference to FIG. 3, using the training images segmented into the subgroup. Continuing the previous example, a classification model may be trained for each month of the year for each location-based group. For example, the location-based group that includes Phoenix may have an image classification model for each month of the year. An image classification model for the month of January and for a location-based group can be trained to predict whether—or how likely it is that—an image captured within the geographic boundaries of the location-based group was captured during the month of January.

A multi-class image classification model can be generated for each location-based group using the image classification models for each time-based subgroup of the location-based group (508). For example, the image classification subsystem 120 can generate a one-versus-all model for each location-based group using the image classification models for each time-based subgroup of the location-based group. The one-versus-all model can be configured for applying the image classification model for each time-based subgroup to a feature vector of an input image, compare the output of each image classification model to determine which image classification model output the highest score, and consider the input image to have been captured during the seasonal time period for the image classification model that output the highest score.

Continuing the previous example, the image classification model for each month for the location-based group that includes Phoenix can be applied to an image feature vector for an image captured in Phoenix. The output of each image classification model can then be compared to determine which image classification model output the highest score. The image classification subsystem 120 can predict that the input image was captured during the month for the image classification model output the highest score.

The image classification models that are generated can be used, for example, to search images by seasonal criterion. One example of such a search process is described with reference to FIG. 6, which is a flow chart of an example process 600 for providing image search results in response to a search query. The process 600 can, for example, be implemented by one or more data processing apparatuses of the search system 110.

Query data defining a query is received from a user device 106 (602). The received query can be, for example, an image search query submitted by a user using a user device 106. The query data can be received, for example, by the search system 110. The query may include a search query image or a text string. For example, the query for the Eiffel Tower may be an image of the Eiffel Tower or the text "Eiffel Tower."

A set of images relevant to the received query is identified (604). For example, the search system 110 may identify images that are relevant to the received query. The set of images may be identified based on a relevance score for each image with respect to the received query. For example, the search system 110 may identify a certain number of the images having the highest relevance scores.

A determination is made whether a filter event has occurred (606). A filter event may be an event that specifies a desired time or time period for images. An example of a filter event may be text in the received query that specifies a time or time period, such as "autumn," "morning," or "10:00 AM." Another example of a filter event may be the receipt of data specifying a time or time period selected using a time-filter user interface control element, such as a slider, scroll bar, interactive timeline, or interactive clock, that allows the user to select a desired seasonal time period. For example, the user may interact with the user interface control element to select a desired time or time period for images. In turn, the user device 106 may generate a signal specifying the selected time or time period and send the signal to the search system 110.

If it is determined that a filter event has not occurred, search results are generated that reference the set of images identified as being relevant to the received query (608). For example, the search system 110 may generate a search result for each image of the set of images. The generated search results are provided to the user device 106 that provided the query (610). For example, the search system 110 may transmit the search results to the user device 106 over the network 102. The provided search results may be ordered according to the relevance scores for the images referenced by the search results.

If it is determined that a filter event has occurred, images meeting the criteria of the filtering event are identified (612). For example, the criteria of the filter event may specify a desired time or time period for image search results. In some implementations, the image classification subsystem 120 predicts the seasonal time period for which each indexed image was captured and includes information in the search index 112 that indicates the predicted seasonal time period for the image. In some implementations, the search system 110 can access the search index 112 to identify which of the set of images relevant to the query was predicted to have been captured at the time or during the time period specified by the filter event.

Figure 6:
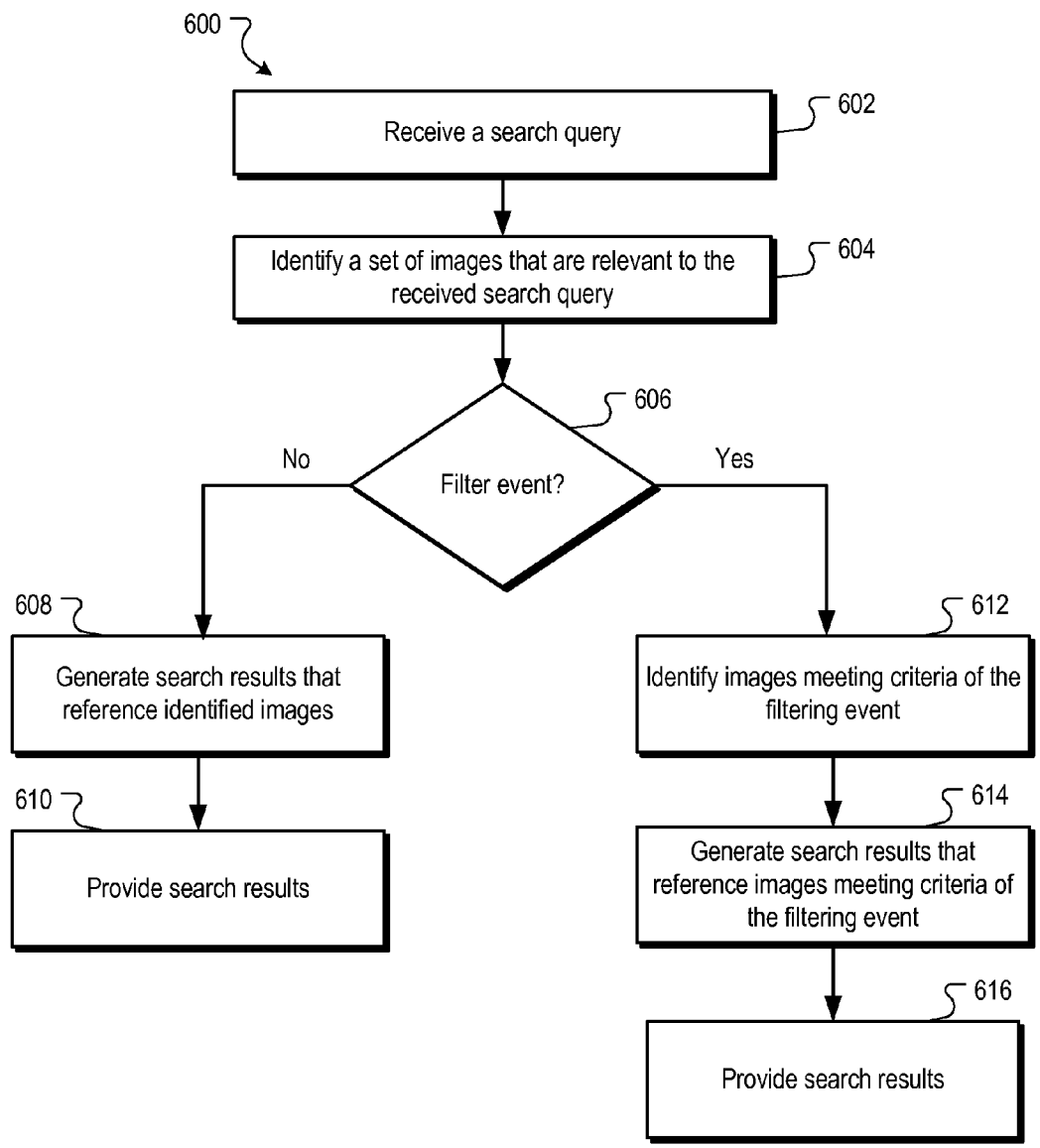
FIG. 6 is a flow chart of an example process for providing image search results in response to a search query.

In some implementations, the image classification subsystem 120 predicts the seasonal time period at query time using previously trained classification models. In some implementations, the search system 110 may provide image data for the set of images to the image classification subsystem 120. In turn, the image classification subsystem 120 can extract content feature values for each image from the image data and generate a feature vector for each image from the content feature values for the image. The image classification subsystem 120 can also identify appropriate image classification model(s) and the apply the model(s) to the feature vectors to determine which images, if any, were captured during at the specified time or during the specified time period. The image classification subsystem 120 can provide data specifying the images that are predicted to have been captured during the specified time period to the search system 110. An example process for identifying images captured during a specified seasonal time period is illustrated in FIG. 6 and described below.

Search results are generated that reference the images that are predicted to have been captured during the specified time period (614). For example, the search system 110 may generate a search result for each image. The generated search results are provided to the user device 106 that provided the query (616). For example, the search system 110 may transmit the search results to the user device 106 over the network 102. The provided search results may be ordered according to the relevance scores for the images referenced by the search results.

Figure 7:
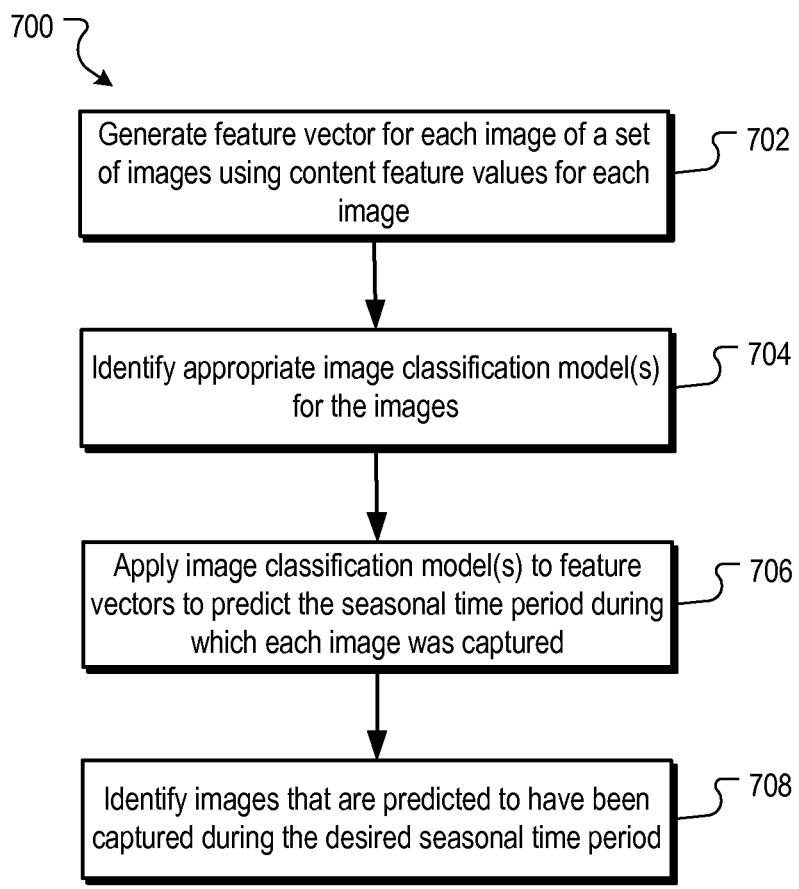
FIG. 7 is a flow chart of an example process for identifying images captured during a specified time period.

FIG. 7 is a flow chart of an example process 700 for identifying images captured during a specified time period. The process 700 can, for example, be implemented by the data processing apparatus of the image classification subsystem 120.

A feature vector is generated for each image of a set of images (702). The set of images may be images identified as being responsive to a query and provided to the image classification subsystem 120. For example, the search system 110 may identify images depicting Stonehenge in response to receiving the query "Stonehenge" or the query "famous landmarks" and provide the image data for the identified images to the image classification subsystem 120.

The image classification subsystem 120 can generate a feature vector for each image using the image data for the image. For example, the image classification subsystem 120 can extract content feature values for each image and generate a feature vector for the image using the extracted content feature values.

Appropriate image classification models are identified for the images (704). For example, the query received by the search system 110 may include a desired seasonal time period specified by the user that submitted the query. The image classification subsystem 120 can identify one or more image classification models, for example that are stored in the model store 116, that have been trained to predict whether an image was captured during the specified time period. For example, if the specified seasonal time period is an annual season, the image classification subsystem 120 can identify one or more image classification models that have been trained to predict the annual season for images.

For implementations in which image classification models have been trained based on location, the image classification subsystem 120 can identify image classification models for the location associated with the query. Continuing the Stonehenge example, the image classification subsystem 120 may identify image classification models trained to predict the seasonal time period for images for a location-based group that includes Stonehenge, such as a location-based group for the U.K., England, or the county of Wiltshire.

The identified image classification model(s) are applied to the feature vectors to predict the seasonal time period during which the images corresponding to the feature vectors were captured (706). For example, if the desired seasonal time period is an annual season, the image classification subsystem 120 may apply the feature vector to an image classification model for each annual season to determine which annual season the image corresponding to the feature vector was captured, in a one-versus-all implementation. In a one-versus-one approach, the image classification subsystem 120 may apply a set of one-versus-one image classification models to the feature vector to determine which annual season receives the most votes. After predicting the seasonal time period for each image, the image classification subsystem 120 may associate each image with its predicted seasonal time period.

Images that are predicted to have been captured during the specified seasonal time period are identified (708). For example, the image classification subsystem 120 can compare the predicted seasonal time period for each image to the specified seasonal time period to determine which images are predicted to have been captured during the specified seasonal time period.

Although the example classification process above is described as occurring at query time, the classification can be done off-line to generate appropriate index data that is associated with the image and persisted in a search index. For example, each time an image is discovered by or uploaded to the search system 110, the image may be classified according to seasonality, time and location.

Figure 8:
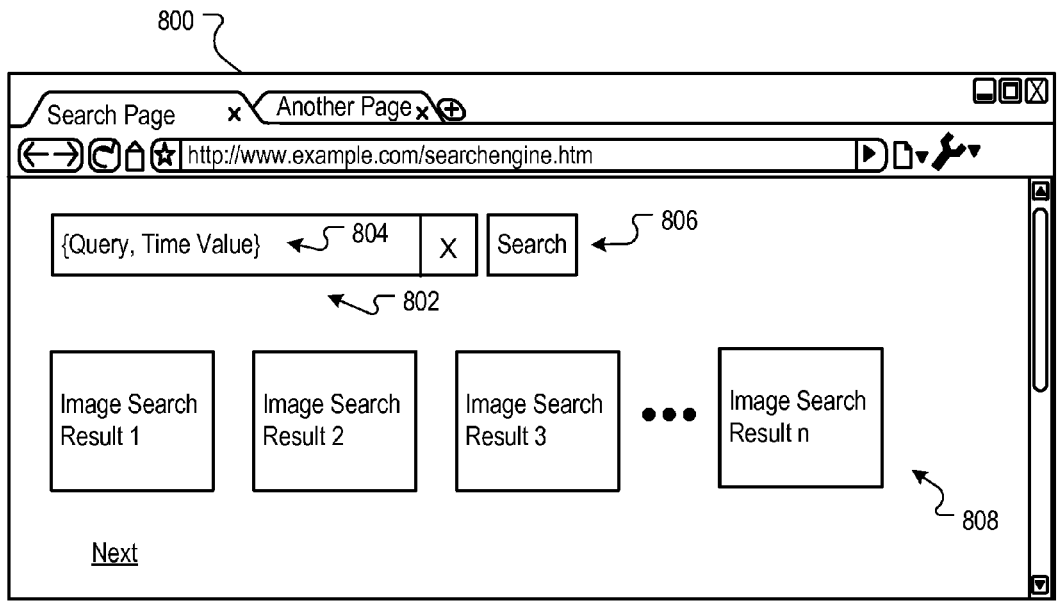
FIG. 8 is an illustration of an example search interface that enables a user to specify a time period for image search results.

FIG. 8 is an illustration of an example search interface 800 that enables a user to specify a time period for image search results. The search interface 800 may be implemented in a web browser window, for example, and presented on a user device 106. Or, the search interface 800 may be implemented in an application, such as an app for a smartphone.

The search interface 800 includes a query entry field 802 in which a user can enter a search query 804. As shown in FIG. 8, the search query 804 can include a textual query and a time value that specifies a time of day, period of time during the day, e.g., morning, evening, etc., date, month, annual season, or other seasonal time period for which images related to the query are desired. For example, the textual query may be "Washington Monument" and the time value may be "spring." The search interface 800 also includes a search initiation element 806 with which the search query 804 can be submitted to the search system 110.

Although described in the context of a text query, the query need not be limited to text. For example, in some implementations, the query can be an image query, and the user can specify time values, e.g., the query may include the image, and the for time constraint of "winter."

In FIG. 8, the search query 804 has been submitted to the search system 110, and in response, the search system 110 has provided image search results 808. As described above, the search system 110 can identify images that are relevant to a search query and provide search results that are relevant to the search query. For search queries directed to images that include a specified time period, such as the search query 804, the search system 110 can provide image search results 808 that are relevant to the query and that are identified or predicted to have been captured by an image capturing device during the specified time period.

Figure 9:
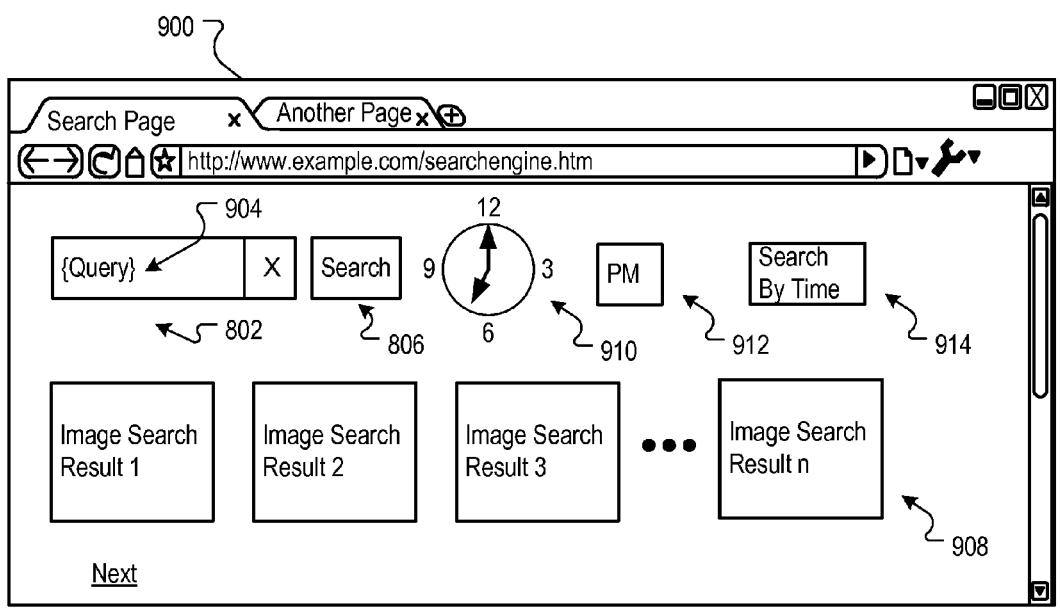
FIG. 9 is an illustration of another example search interface that enables a user to specify a time period for image search results.

FIG. 9 is a screen shot of another example search interface 900 that enables a user to specify a time period for image search results. Similar to the search interface 800, the search interface 900 includes a query entry field 802 in which a user can enter a search query 904 and a search initiation element 806 with which the search query 904 can be submitted to the search system 110. In FIG. 9, search query 904 has been submitted to the search system 110, and in response, the search system 110 has provided image search results 908.

The search interface 900 also includes an interactive clock user interface control element 910 that enables a user to select a time during the day for which images are desired. A user can select a time by selecting the hour and/or minute hands, e.g., using a mouse cursor, and rotating the hand(s) to the desired time. The search interface 900 also includes a selector box 912 that enables the user to select between AM and PM for the time specified using the interactive clock user interface control element 910. In some implementations, a text entry box may be provided in place—or in addition to—the interactive clock user interface control element 910 that enables the user to enter the desired time or a desired range of times.

The search interface 900 also includes a search by time initiation element 914 that the user can select to initiate a filtering event that filters the image search results 908 based on the time selected using the interactive clock user interface control element 910 and the selector box 912. When the filtering event is initiated, the user device 106 can transmit data specifying the selected time to the search system 110. In turn, the search system 110 can identify images that are responsive to the query 904 and that were captured at or near the selected time, generate search results that reference those images, and provide the search results to the user device 106 for presentation as the image search results 908.

In some implementations, the interactive clock user interface control element 910 and the selector box 912 are provided on the search interface 900 prior to the user submitting a search query, for example as a default for image searches. In some implementations, a user can select a desired time for images as part of the user's original query and the user device 106 can transmit the user query and the user specified time to the search system 110 in a single data transmission.

In some implementations, the interactive clock user interface control element 910 is provided after image search results 908 are provided in response to a search query, to enable the user to filter the search results 908. In some implementations, the user device 106 can transmit the user selected time to the search system 110 along with a request to filter the image search results 806 based on the user selected time. In turn, the search system 110 can determine which of a set of images previously identified as being relevant to the search query were captured at or near the user selected time, generate search results that reference those images, and provide the search results to the user device 106.

Figure 10:
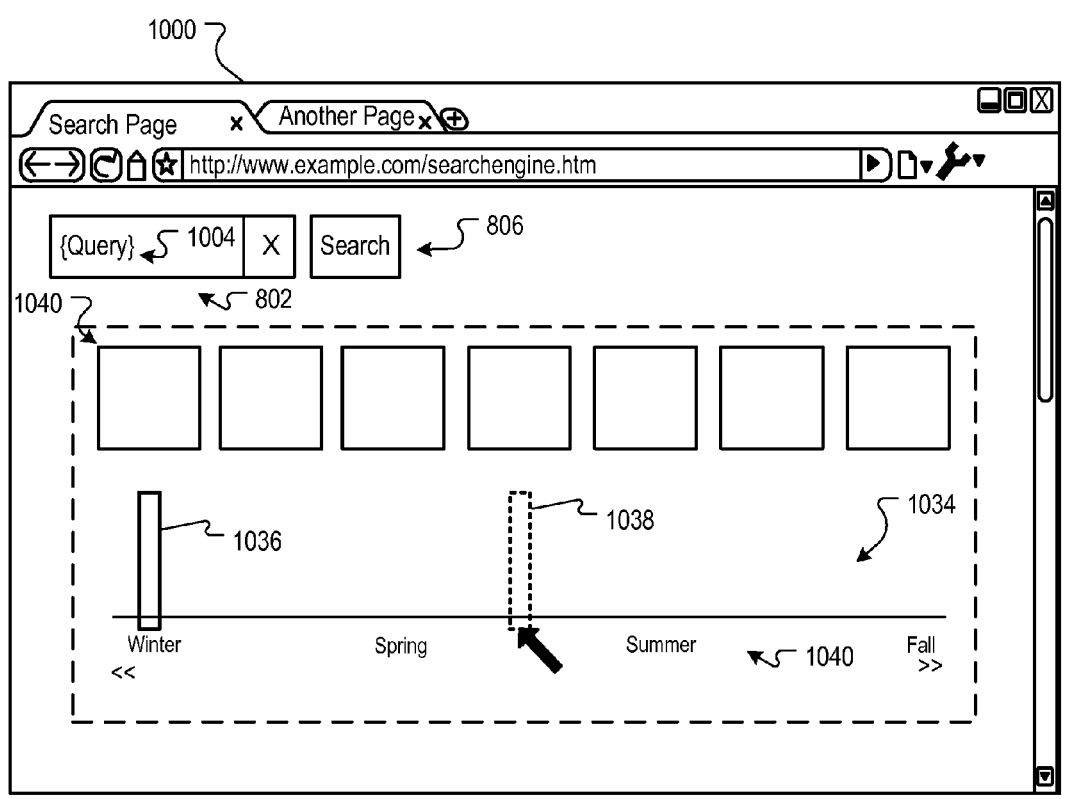
FIG. 10 is an illustration of another example search interface that enables a user to specify a time period for image search results.

FIG. 10 is a screen shot of another example search interface 1000 that enables a user to specify a time period for image search results. The search interface 1000 includes a query entry field 802 in which a user can enter a search query 1004 and a search initiation element 906 with which the search query 1004 can be submitted to the search system 110. In FIG. 10, search query 1004 has been submitted to the search system 110, and in response, the search system 110 has provided image search results 1040.

The search interface 1000 also includes an interactive timeline user interface control element 1034 that enables a user to select an annual season for which to view image search results 1040. The interactive timeline user interface control element 1034 includes a slider 1036 that the user can move along a timeline 1040 to select an annual season. For example, the slider 1036 is illustrated as being positioned along the timeline 1040 to view images captured during the winter. The user can select the slider 1036, for example using a mouse, and move the slider horizontally along the timeline 1040 to another position, such as between spring and summer as illustrated by the slider 1038 having a dashed outline.

When the slider 1036 is moved from one position to another, the user device 106 can identify that the slider 1036 has been moved and the new location of the slider 1036. In turn, the user device 106 can transmit the seasonal time period corresponding to the new location to the search system 110 and the search system 110 can identify and provide as search results images that are responsive to the search query 1004 and that were captured during that seasonal time period.

In some implementations, the image search results 1040 are updated in real time or near real time in response to the slider 1036 being moved along the timeline 1040. For example, images responsive to the search query 1004 and captured during each seasonal time period that can be selected using the interactive timeline user interface control element 1034 are transmitted to the user device 106 in response to receiving the search query 106. The user device 106 can then identify and present the appropriate images based on the position of the slider 1036.

In some implementations, the search system 110 is configured to provide images as search results based on the subject and vantage point of an input image. For example, a user visiting a landmark on a spring morning may want to view images of the landmark at night and/or during the winter. The user can capture an image of the subject and send the image to the search system 110, for example using a user device 106. The search system 110 can process the image and return to the user device 106 other images of the subject captured during other seasonal time periods, or images captured during a seasonal time period specified by the user.

Figure 11:
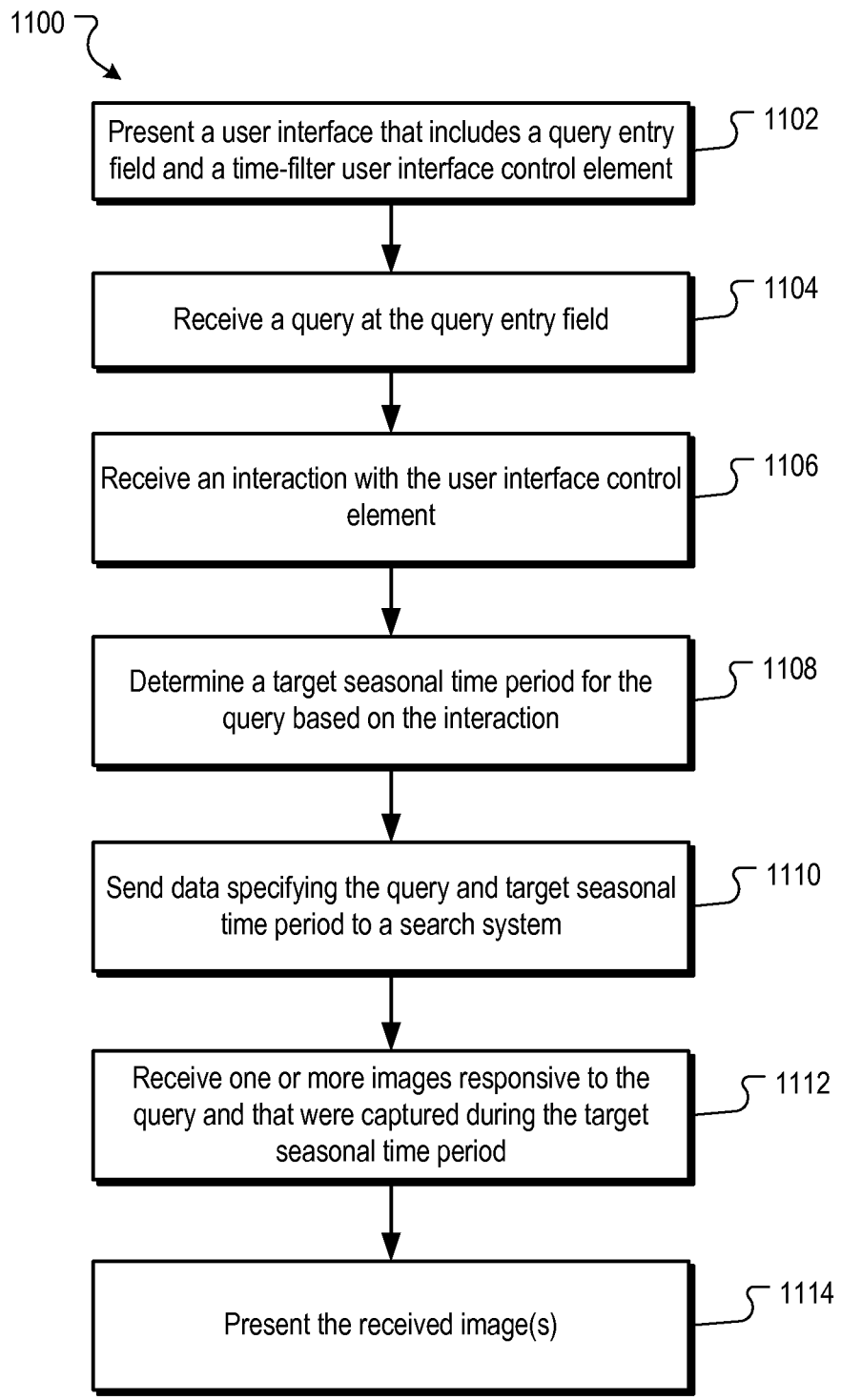
FIG. 11 is a flow chart of an example process for presenting images responsive to a query for images captured during a target seasonal time period.

FIG. 11 is a flow chart of an example process 1100 for presenting images responsive to a query for images captured during a target seasonal time period. The process 1200 can, for example, be implemented by one or more data processing apparatuses of a user device 106.

A user interface is presented (1102). In some implementations, the user interface includes a query entry field and a time-filter user interface element. For example, the user interface may be a search interface, such as the search interface 900 or the search interface 1000 described above. The user interface may be provided to the user device 106 by the search system 110, for example in response to a request from the user device 106.

A query is received at the query entry field (1104). For example, a user may input a query into the query entry field. The query may indicate a subject for images that the user would like to view.

An interaction with the user interface control element (1106). A user may interact with the user interface control element to select a target seasonal time period for image search results. In one example, with reference to FIG. 9, a user may interact with an interactive clock user interface control element 910 to select a time during the day. In another example, with reference to FIG. 10, a user may move a slider 1036 across a timeline 1034 to select an annual season.

A target seasonal time period is determined based on the interaction with the user interface control element (1108). In some implementations, the user device 106 is configured to determine the target seasonal time period based on the position of the user interface control element. For example, a script or other embedded instructions included in the user interface may cause the user device 106 to determine the target seasonal time period based on the position of the user interface control element. In some implementations, the user device 106 determines the target seasonal time period in response to a selection of a search by time initiation element, such as the search by time initiation element 914 of FIG. 9.

Data specifying the query and target seasonal time period are provided to a search system (1110). For example the user device 106 may provide the data to the search system 110 of FIG. 1. In response to receiving the data, the search system 110 can identify one or more images responsive to the query and that were captured during or at about the target seasonal time period. For example, the process of FIG. 5 may be implemented by the search system 110 to identify the one or more images.

One or more images responsive to the query and that were captured during or at about the target seasonal time period are received (1112). For example, the search system 110 may provide the identified one or more images to the user device 106. The received images are presented (1114). For example, the user device 106 may present the received images as image search results at the user interface.

Figure 12:
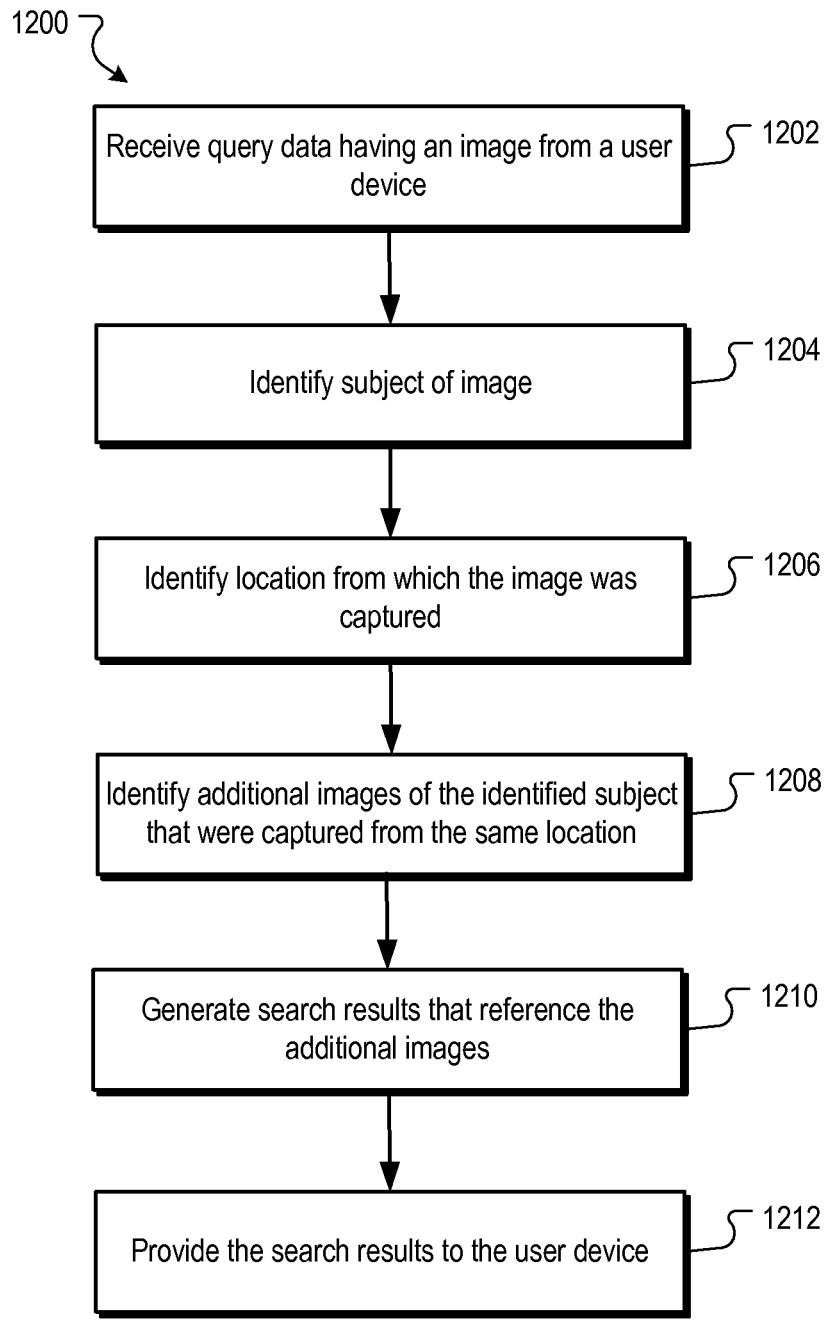
FIG. 12 is a flow chart of an example process for providing images in response to an image search query.

FIG. 12 is a flow chart of an example process 1200 for providing images in response to an image search query. The process 1200 can, for example, be implemented by one or more data processing apparatuses of the search system 110.

Query data including image data defining an image is received from a user device 106 (1202). The query data can be received, for example, by the search system 110. The query data may also include data specifying a desired seasonal time period for image search results, such as an annual season, month of the year, or period of time during the day. For example, the user can specify a desired time period for images using text or a user interface control element, as described above.

The subject of the received image is identified (1204). In some implementations, the search system 110 uses image recognition technology to identify an object in an image. For example, the search system 110 may be configured to identify landmarks, storefronts, city skylines, or other objects or subjects included in an image.

In general, the search system 110 identifies the subject of images by detecting objects in the image and identifying the detected objects. For example, the search system 110 may utilize object detection and segmentation techniques to detect objects in the image. The search system 110 may then compare the visual characteristics of each object to visual characteristics of known objects to determine what the object in the image may be.

The location at which the received image was captured is identified (1206). For example, the image data may include a geolocation tag that specifies the location from which the received image was captured. The search system 110 can determine whether the image data includes a geolocation tag and, if the image data includes a geolocation tag, identify the location specified by the geolocation tag.

In some implementations, the user device 106 includes a location sensor, such as a GPS receiver, that can identify the location of the user device 106. When an image is captured, the user device 106 may associate a geolocation tag with the image, for example in the image file for the image that specifies the location from which the image was captured. In some implementations, the user device 106 may interact with the location sensor to determine the location of the user device 106 when the user initiates a search using an image as the query and provides a geolocation tag that specifies the location with the query.

In some implementations, the search system 110 identifies the subject and location for the image by identifying images that are similar to the received image. For example, the search system 110 may compare visual characteristics of the received image to other images indexed in the search index 112 to identify images having similar visual characteristics.

By way of another example, the search system 110 or the image classification subsystem 120 may compare a feature vector of the received image to feature vectors of other images to identify images that are similar to the received image.

In some implementations, the search system 110 identifies the view point or vantage point from which the received image was captured based on location information and information specifying the direction in which the image capturing device that captured the received image was facing at the time the image was captured. For example, a user device 106, such as a smart phone, that includes a camera may also include a compass or other orientation sensor that identifies the direction the user device 106 is facing, or the direction that a particular surface of the user device 106 is facing, e.g., the surface in which the camera lens is disposed. When an image is captured, the user device 106 can associate the directional information and the location information with the captured image, for example in an Exif file.

A directional tag can be included in the search index 112 for images that have associated direction information. The directional tag for an image can include data specifying the direction that the image capturing device that captured the image was facing at the time the image was captured. For example, if a photographic lens of a camera is facing true north at the time an image is captured, as indicated by the Exif file for the image, the search system 110 can include a directional tag for the image in the search index 112 that specifies that the image was captured by an image capturing device facing true north.

Images of the subject of the received image that were captured from the location from which the received image was captured are identified (1208). For example, the search system 110 may access the search index 112 to identify images having a label that matches the subject and a geolocation tag specifying a location that matches the identified location for the received image. The label of an image may be considered a match with the subject of the received image if the label is the same as the subject or is sufficiently similar to the subject of the received image. The geolocation tag for an image may be considered a match with the location for the received image if the geolocation tag specifies a location within a threshold distance from the location for the received image. For example, the threshold distance may be ten meters, a hundred meters, or any other distance measure.

In some implementations, the search system 110 may identify images of the subject of the received image that were captured from the location from which the received image was captured based on location and vantage point information. For example, the search system 110 may identify images that have a geolocation tag that specifies a location that matches the identified location for the received image and that also have a directional tag that specifies a direction that matches the direction that the device that captured the received image was facing when the received image was captured. That is, the search system 110 may identify images that were captured from the same location as the received image, or a nearby location, and that were also captured by a device facing in the same direction as the device that captured the received image.

A directional tag may be considered to match the direction for the received image if the directional tag specifies a direction within a threshold directional tolerance from the direction that the device that captured the received image was facing. For example, the directional information for the received image may indicate that the received image was captured by a camera facing 15° north of true east. In this example, the threshold direction tolerance may be 10° degrees. Images captured between 5° degrees north of true east and 25° degrees north of true east may be considered matching the direction for the received image.

Search results that reference the identified images are generated (1210). For example, the search system 110 may generate search results that reference the identified images. The search system 110 may also order the search results based on the match between the location of the identified images and the received image. For example, GPS information for an image may indicate that the image is closer to the location at which the received image was captured than another image and thus, the closer image may be ranked higher than the other image in the order.

The identified additional images are provided to the user device 106 for presentation to the user (1212). For example, the search system 110 may transmit the search results to the user device 106 over the network 102.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of this document or of what may be claimed, but rather as descriptions of features specific to particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
receiving a query comprising image data defining an image depicting a subject;
determining a location at which the image was captured by an image capturing device;
identifying, based on the query and the location, one or more additional images of the subject that were captured by an image capturing device at the determined location, the identifying comprising:
identifying a direction in which the image capturing device that captured the image was facing at a time at which the image was captured; and
identifying, as the one or more additional images, one or more images that were captured by an image capturing device located within a threshold distance of the determined location and that was facing in a direction that is within a threshold directional tolerance of the identified direction; and
providing at least a portion of the one or more additional images in response to receiving the query.

2. The method of claim 1, wherein determining the location at which the image was captured comprises receiving, with the query, location information specifying the location.

3. The method of claim 1, further comprising identifying the subject of the image by:
creating a feature vector for the image, the feature vector for the image comprising content feature values, each content feature value indicating a visual characteristic of the image; and
comparing the feature vector for the image to feature vectors for a plurality of images to identify images having a feature vector similar to the feature vector of the image.

4. The method of claim 1, further comprising:
providing a user interface object that enables a user to select a seasonal time period for image search results;
receiving a selection of a seasonal time period via the user interface object; and
identifying, as the portion of the one or more additional images, one or more images that were captured by an image capturing device during the selected seasonal time period.

5. The method of claim 4, wherein identifying the portion of the one or more additional images comprises:
identifying, for each particular image of the one or more additional images, a seasonal time period during which the particular image was captured by an image capturing device using one or more image classification models; and
identifying, as the portion, each additional image identified as being captured during the selected seasonal time period.

6. The method of claim 5, wherein the user interface object comprises a timeline and a slider, the slider being moveable along the timeline to select the desired seasonal time period.

7. The method of claim 6, further comprising selecting, as the portion of the one or more additional images, images captured during a plurality of seasonal time periods.

8. A system, comprising:
a data processing apparatus;
a memory storage apparatus in data communication with the data processing apparatus, the memory storage apparatus storing instructions executable by the data processing apparatus and that upon such execution cause the data processing apparatus to perform operations comprising:
receiving a query comprising image data defining an image depicting a subject;
determining a location at which the image was captured by an image capturing device;
identifying, based on the query and the location, one or more additional images of the subject that were captured by an image capturing device at the determined location, the identifying comprising:
identifying a direction in which the image capturing device that captured the image was facing at a time at which the image was captured; and
identifying, as the additional images, images that were captured by an image capturing device located within a threshold distance of the determined location and that was facing in a direction that is within a threshold directional tolerance of the identified direction; and
providing at least a portion of the one or more additional images in response to receiving the query.

9. The system of claim 8, wherein determining the location at which the image was captured comprises receiving, with the query, location information specifying the location.

10. The system of claim 8, wherein the instructions upon execution cause the data processing apparatus to perform further operations comprising identifying the subject of the image by:
creating a feature vector for the image, the feature vector for the image comprising content feature values, each content feature value indicating a visual characteristic of the image; and
comparing the feature vector for the image to feature vectors for a plurality of images to identify images having a feature vector similar to the feature vector of the image.

11. The system of claim 8, wherein the instructions upon execution cause the data processing apparatus to perform further operations comprising:
providing a user interface object that enables a user to select a seasonal time period for image search results;
receiving a selection of a seasonal time period via the user interface object; and
identifying, as the portion of the one or more additional images, one or more images that were captured by an image capturing device during the selected seasonal time period.

12. The system of claim 11, wherein identifying the portion of the one or more additional images comprises:
identifying, for each particular image of the one or more additional images, a seasonal time period during which the particular image was captured by an image capturing device using one or more image classification models; and
identifying, as the portion, each additional image identified as being captured during the selected seasonal time period.

13. The system of claim 12, wherein the user interface object comprises a timeline and a slider, the slider being moveable along the timeline to select the desired seasonal time period.

14. The system of claim 13, wherein the instructions upon execution cause the data processing apparatus to perform further operations comprising selecting, as the portion of the one or more additional images, images captured during a plurality of seasonal time periods.

15. A non-transitory computer storage medium encoded with a computer program, the program comprising instructions that when executed by a data processing apparatus cause the data processing apparatus to perform operations comprising:

receiving a query comprising image data defining an image depicting a subject;

determining a location at which the image was captured by an image capturing device;

identifying, based on the query and the location, one or more additional images of the subject that were captured by an image capturing device at the determined location, the identifying comprising:

identifying a direction in which the image capturing device that captured the image was facing at a time at which the image was captured; and identifying, as the additional images, images that were captured by an image capturing device located within a threshold distance of the determined location and that was facing in a direction that is within a threshold directional tolerance of the identified direction; and providing at least a portion of the one or more additional images in response to receiving the query.

16. The non-transitory computer storage medium of claim 15, wherein determining the location at which the image was captured comprises receiving, with the query, location information specifying the location.

17. The non-transitory computer storage medium of claim 15, wherein the instructions upon execution cause the data processing apparatus to perform further operations comprising identifying the subject of the image by:

creating a feature vector for the image, the feature vector for the image comprising content feature values, each content feature value indicating a visual characteristic of the image; and comparing the feature vector for the image to feature vectors for a plurality of images to identify images having a feature vector similar to the feature vector of the image.

18. The non-transitory computer storage medium of claim 15, wherein the instructions upon execution cause the data processing apparatus to perform further operations comprising:

providing a user interface object that enables a user to select a seasonal time period for image search results;

receiving a selection of a seasonal time period via the user interface object; and identifying the portion of the one or more additional images, one or more images that were captured by an image capturing device during the selected seasonal time period.

19. The non-transitory computer storage medium of claim 18, wherein identifying the portion of the one or more additional images comprises:

identifying, for each particular image of the one or more additional images, a seasonal time period during which the particular image was captured by an image capturing device using one or more image classification models; and identifying, as the portion, each additional image identified as being captured during the selected seasonal time period.

20. The non-transitory computer storage medium of claim 19, wherein the user interface object comprises a timeline and a slider, the slider being moveable along the timeline to select the desired seasonal time period.

* * * * *